United States Patent [19]

Itoh et al.

[11] Patent Number: 4,763,139

[45] Date of Patent: Aug. 9, 1988

[54] OPTICAL INFORMATION STORAGE MEDIUM

[75] Inventors: Masaki Itoh; Akio Morimoto; Sotaro Esho, all of Tokyo, Japan

[73] Assignee: NEC Corporation, Japan

[21] Appl. No.: 893,040

[22] Filed: Aug. 1, 1986

[30] Foreign Application Priority Data

Aug. 8, 1985 [JP] Japan ................................. 60-175137
Aug. 8, 1985 [JP] Japan ................................. 60-175138

[51] Int. Cl.$^4$ ........................................... G01D 15/34
[52] U.S. Cl. ................................. 346/135.1; 346/76 L; 430/495
[58] Field of Search .......................... 346/135.1, 76 L; 430/495; 369/288

[56] References Cited

U.S. PATENT DOCUMENTS

| | | | |
|---|---|---|---|
| 4,230,939 | 10/1980 | de Bont | 346/76 L X |
| 4,461,807 | 7/1984 | Mori | 346/135.1 X |
| 4,499,178 | 2/1985 | Wada | 346/135.1 X |
| 4,587,209 | 5/1986 | Ohno | 346/135.1 X |

*Primary Examiner*—Joseph W. Hartary
*Attorney, Agent, or Firm*—Laff, Whitesel, Conte & Saret

[57] ABSTRACT

An optical information storage medium comprising a transparent substrate and an information carrying layer positioned on one side of the substrate, wherein the information carrying layer contains at least 30 percent by volume of tin and at least 20 percent by volume of nickel oxide. The information carrying layer may be formed directly on one surface of the substrate. Alternatively, the information storage medium may further comprise a first spacer layer formed on one surface of the substrate and a second spacer layer which intervenes between the first spacer layer and the information carrying layer, wherein the first spacer layer is substantially transparent to a radiation with a predetermined wavelength and is larger in refractive index than the substrate at the aforesaid wavelength and the second spacer layer is substantially transparent to the aforesaid radiation and is smaller in refractive index than the first spacer layer at the aforesaid wavelength.

13 Claims, 5 Drawing Sheets

OPTICAL INFORMATION STORAGE MEDIUM

FIELD OF THE INVENTION

The present invention relates to information storage materials and, more particularly, to an optical information storage medium for having information stored therein by means of a high-energy an optical, electrical or thermal radiation beams such as, typically a laser beam.

BACKGROUND OF THE INVENTION

An optical information storage medium is used for recording information in the form of a series of pits arranged to form a myriad of coaxial, spiral or linear information tracks provided in the record medium. Such an information storage medium is advantageous for implementing an information recording and reproducing disc of the mass storage type for its high storage density as well known in the art.

An information storage medium of this nature is typically provided in the form of a multi-layer structure which consists of a transparent substrate and an information carrying layer of a low-melting point metal deposited on the substrate. As such a low-melting point metal is used, for example, tellurium or bismuth or any alloy containing one or both of these, as disclosed in Japanese Patent Specification No. 54-15483. Similar optical information storage materials are shown in, for example, U.S. Pat. Nos. 3,971,874 and 4,188,214.

From the viewpoint of providing a high degree of optical sensitivity, tin in particular is preferred as a low-melting point metal for use in such an information storage medium. A known information storage medium using tin as a low-melting point metal is however not fully acceptable for achieving information reproducing signals of satisfactory quality and has not been used for practical purposes.

The requirements of an information storage medium for use on an optical information recording and reproducing system include a high degree of reflectivity which is stable at various wavelengths of the incident radiation used. This requirement is of importance for providing stability of operation of the focus and tracking servo systems included in the recording and reproducing system. In order to achieve a desired degree of reflectivity in an optical information storage medium using a low-melting point metal for its information carrying layer, it is required to have the thickness and/or the chemical composition of the layer. This results in a difficulty in providing sustained recording and reproducing capabilities for the resultant information storage medium.

It is, accordingly, an important object of the present invention to provide an improved optical information storage medium which is acceptable for achieving information reproducing signals of satisfactory quality.

It is another important object of the present invention to provide an improved optical information storage medium which is highly sensitive to an incident beam of radiation such as a laser beam and which has high and stable reflectivity providing sustained recording and reproducing capabilities.

Yet it is another important object of the present invention to provide an improved optical information storage medium which is easy and economical to manufacture and which is adapted for use on a practical basis.

SUMMARY OF THE INVENTION

In accordance with the present invention, there is provided an optical information storage medium comprising a substantially transparent substrate and an information carrying layer positioned on one side of the substrate, wherein the information carrying layer contains at least 30 percent by volume of tin and at least 20 percent by volume of nickel oxide. In one preferred embodiment of the present invention, the information carrying layer may be formed directly on one surface of the substrate. In another preferred embodiment of the present invention, the information storage medium may further comprise a first spacer layer formed on one surface of the substrate and a second spacer layer which intervenes between the first spacer layer and the information carrying layer, wherein the first spacer layer is substantially transparent to a radiation with a predetermined wavelength and is larger in refractive index than the substrate at the aforesaid wavelength and the second spacer layer is substantially transparent to the aforesaid radiation and is smaller in refractive index than the first spacer layer at the aforesaid wavelength. An optical information storage medium according to the present invention may further comprise an additional layer of an organic compound intervening between the second spacer layer and the information carrying layer, wherein the second spacer layer consists of an organic material.

An optical information storage medium proposed by the present invention is characterized, inter alia, in that tin is used in combination with nickel oxide for forming the information carrying layer of the medium. The tin component of the information carrying layer is advantageous in that it provides a high degree of recording sensitivity for the information storage medium. If, however, the information carrying layer of an optical information storage medium were constructed solely of tin, then the information storage medium could not be used for practical purposes because of the poor surface state of the layer of tin. Such a poor surface state results from the particular crystal structure of a bulk of tin. When tin is used in combination with nickel oxide for the formation of an information carrying layer and the proportion between the tin and nickel components of such an information carrying layer is selected as herein specified, the information carrying layer has a significantly improved surface state which enables the information storage medium to provide excellent performance characteristics when used on an optical information recording and reproducing apparatus.

BRIEF DESCRIPTION OF THE DRAWINGS

The drawbacks of a prior-art optical information storage medium of the described general nature and further details of an optical information storage medium according to the present invention will be more clearly understood from the following description taken in conjunction with the accompanying drawings in which like reference numerals designate similar or corresponding structures and elements and in which.

DESCRIPTION OF THE PREFERRED EMBODIMENTS

First Preferred Embodiment

Figure 1:
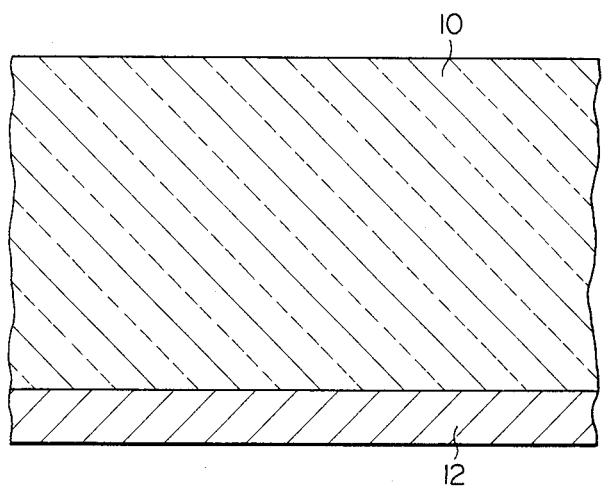
FIG. 1 is a fragmentary sectional view showing the basic construction of a first preferred embodiment of an optical information storage medium according to the present invention.

Referring to FIG. 1 of the drawings, an optical information storage medium embodying the present invention comprises a substantially transparent substrate 10 and an information carrying layer 12 formed on one surface of the substrate 10. The transparent substrate 10 may be constructed of any desired material such as, for example, a synthetic resin, glass or porcelain. As the synthetic resin may be used an acrylic resin such as polymethyl methacrylate; poly carbonate; polyetherimido; polysulfone; an epoxy resin; or polyvinyl chloride. The substrate 10 is in the form of a circular disc, an elongate tape or an otherwise contoured web. On the surface of such a substrate 10 may be provided a heat insulating layer or a smoothing film if desired, although such an additional layer or film is not shown in the drawings.

In the embodiment of the present invention herein shown, the information carrying layer 12 provided on the transparent substrate 10 is formed of a mixture of tin and nickel oxide (NiO). While the information storage medium using such an information carrying layer 12 will provide satisfactory information recording capabilities, a third component substance may be added to the mixture of tin and nickel oxide to provide an improved weather-proof ability and/or an accurately controlled reflectivity. Examples of such an additional substance include carbon, aluminum, titanium, chromium, iron, cobalt, nickel, copper, zinc, germanium, zirconium, niobium, molybdenum, rhodium, palladium, silver, tantalum, tungsten, platinum, and gold. If desired, one or more of these substances may be used as a further additional component material of the information carrying layer 12.

In accordance with the present invention, the tin component of the information carrying layer 12 accounts in bulk concentration for about 30 percent by volume or more of the information carrying layer 12 and the nickel oxide component of the layer 12 accounts for about 20 percent by volume of the information carrying layer 12 without respect to the chemical composition of the layer 12, for the reasons which will become apparent as the description proceeds. The bulk concentration of the remainder component or components of the information carrying layer 12 is preferably within the range of from about 10 percent to 15 percent of the total bulk of the layer 12 although a higher concentration may be used depending upon the resultant physical properties of the layer 12. For providing satisfactory storage sensitivity and satisfactory quality of the signals to be produced from the information storage medium 10, the thickness of the information carrying layer 12 preferably ranges from about 100 angstroms to about 1000 angstroms and more preferably from about 150 angstroms to about 500 angstroms.

For the recording of information in the information storage medium thus constructed, a series of pits are formed in the information carrying layer 12 by selective irradiation of the layer 12 with, for example, a laser beam. The pits are arranged to form a multiplicity of coaxial or spiral tracks where the storage medium is provided in the form of a circular disc as herein assumed or along a plurality of linear information tracks where the storage medium is provided in the form of an elongated tape. In order that the information tracks formed by these pits be precisely located on the disc, the substrate 10 of the disc is ordinarily formed with coaxial or spiral guide grooves along which the laser beam is to be incident during reproduction of the information from the disc. The laser beam used for the information reproducing operation is collimated to have a cross sectional area approximately equal in diameter to the width of the guide grooves. When such a laser beam is focussed on one of the guide grooves, the beam is diffracted in the groove. If the spot of the beam incident on the substrate 10 happens to deviate radially from the particular groove, there results a change in the space distribution of the intensity of the diffracted beam. The focus servo system of the reproducing apparatus is arranged to detect such a change in the space distribution of light intensity and controls the beam to be correctly directed at the center line of the guide groove. The guide grooves used for ordinary optical information storage discs are usually about 0.3 micron to 1.2 mincron wide and have depths which are approximately equal to one twelfth to one fourth of the wavelength of the laser beam used for the information reproducing operation.

Second Preferred Embodiment

Figure 2:
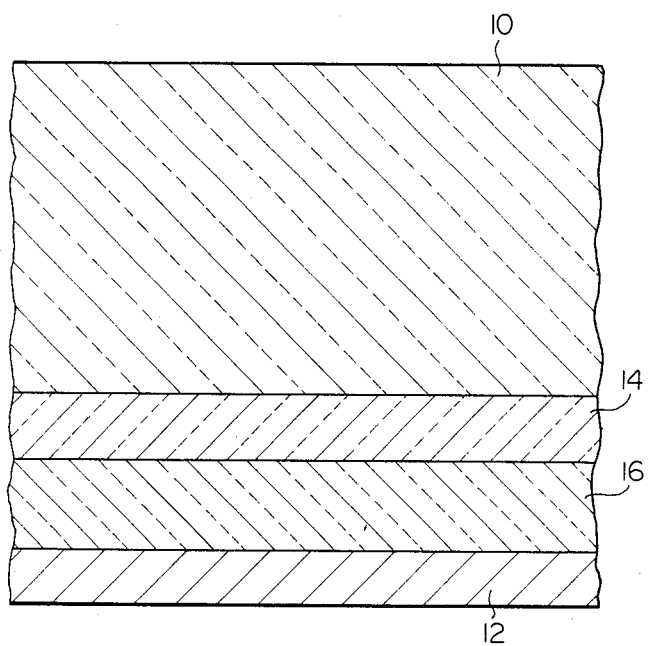
FIG. 2 is a fragmentary sectional view showing the construction of a second preferred embodiment of an optical information storage medium according to the present invention.

Turning to FIG. 2 of the drawings, another form of optical information storage medium embodying the present invention is provided in the form of a three-layer structure comprising, in addition to a transparent substrate 10 and an information carrying layer 12, first and second spacer layers 14 and 16 sandwiched between the substrate 10 and the layer 12. The first spacer layer 14 is formed on one surface of the substrate 10 and the second spacer layer 16 intervenes between the first spacer layer 14 and the information carrying layer 12. Each of the first and second spacer layers 14 and 16 thus provided additionally between the substrate 10 and information carrying layer 12 is constructed of a material which is substantially transparent to a beam of radiation having the wavelength to be used for the recording of information into the storage medium. The combination of such first and second spacer layers 14 and 16 contributes to achieving an increased degree of reflectivity of the storage medium. Thus, the reflectivity of the information carrying layer 12 can be selected at any desired value through proper selection of the respective refractive indices and thicknesses of these first and second spacer layers 14 and 16.

Similarly to its counterpart in the embodiment described with reference to FIG. 1, the transparent substrate 10 of the embodiment herein shown may be constructed of glass, porcelain or any synthetic resin such as an acrylic resin, polycarbonate, polyetherimido, polysulfone, an epoxy resin, or polyvinyl chloride. The information carrying layer 12 in the embodiment of the present invention herein shown is also formed of a mixture of tin and nickel oxide with the tin and nickel oxide components of the layer 12 respectively accounting in bulk concentration for about 30 percent and about 20 percent by volume of the information carrying layer 12. As in the embodiment described with reference to FIG. 1, the information carrying layer 12 may further contain one or more of carbon, aluminum, titanium, chromium, iron, cobalt, nickel, copper, zinc, germanium, zirconium, niobium, molybdenum, rhodium, palladium, silver, tantalum, tungsten, platinum, and gold. The bulk concentration of such an additional component substance or substances is preferably within the range of from about 10 percent to 15 percent of the total bulk of the layer 12. Furthermore, the thickness of the information carrying layer 12 preferably ranges from about 100 angstroms to about 1000 angstroms and more preferably from about 150 angstroms to about 500 angstroms for the reason discussed in regard to the embodiment of FIG. 1.

Figure 3:
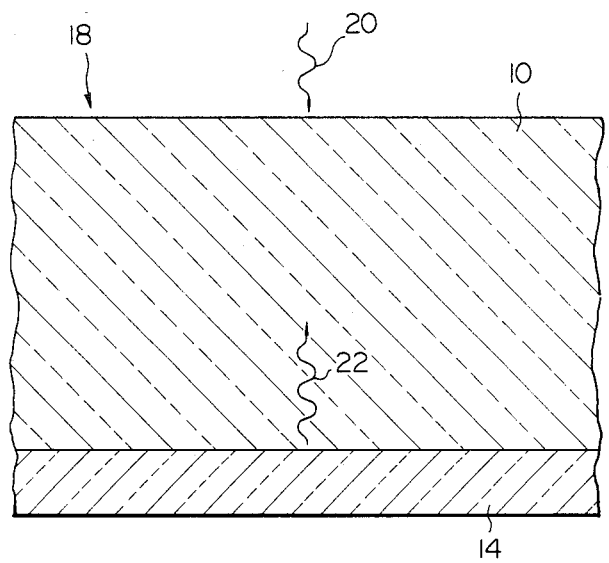
FIG. 3 is a schematic sectional view showing an imaginary structure which forms part of the information storage medium shown in FIG. 2.

To establish criteria for selecting groups of materials operable for each of the first and second spacer layers 14 and 16, an imaginary single-layer structure 18 simply consisting of the substrate 10 and the first spacer layer 14 as shown in FIG. 3 will now be considered.

In the single-layer structure 18 shown in FIG. 3, it is assumed that a beam of light is admitted into the structure 18 through the transparent substrate 10 in a direction normal to the structure as indicated by waving arrow 20. The beam of light thus incident into the structure 18 is reflected partially at the interface between the substrate 10 and the spacer layer 14 and partially at the interface between the spacer layer 14 and the ambient and is thus re-directed backwardly through the substrate 10 as indicated by waving arrow 22. The magnitude of the reflected light with respect to that of the incoming light and hence the reflectivity of the single-layer structure 18 depend upon the index of refraction and thickness of the spacer layer 14. The imaginary single-layer structure 18 shown in FIG. 3 will therefore have a sufficiently large reflectivity when the material to form the first spacer layer 14 of the structure 18 is selected such that the relative magnitude of the reflected light is sufficiently large with respect to that of the incoming light. This means that the respective materials to form the substrate 10 and spacer layer 14 should be selected so that the refractive index of the spacer layer 14 be larger than the refractive index of the substrate 10.

Figure 4:
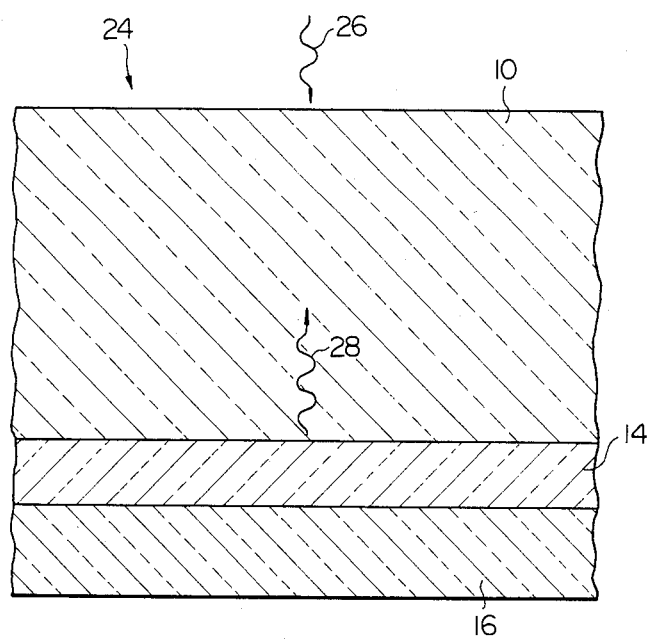
FIG. 4 is a view similar to FIG. 3 but shows another imaginary structure which forms part of the information storage medium shown in FIG. 2.

Consideration will then be taken into account in respect of an imaginary two-layer structure 24 shown in FIG. 4. The structure 24 herein shown has the second spacer layer 16 in addition to the substrate 10 and the first spacer layer 14. In the case of this two-layer structure 24, the beam of light admitted into the structure 18 through the substrate 10 as indicated by waving arrow 26 is reflected partially at the interface between the substrate 10 and the spacer layer 14, partially at the interface between the first and second spacer layers 14 and 16 and partially at the interface between the second spacer layer 16 and the ambient. The beam of light thus reflected is re-directed backwardly through the substrate 10 as indicated by waving arrow 28. In this instance, the magnitude of the reflected light with respect to that of the incoming light and hence the reflectivity of the two-layer structure 24 depend upon the index of refraction and thickness of the second spacer layer 16. The imaginary two-layer structure 24 shown in FIG. 4 will therefore have a sufficiently large reflectivity when the material to form the second spacer layer 16 of the structure 24 is selected such that the relative magnitude of the reflected light is sufficiently small with respect to that of the incoming light. This means that the respective materials to form the substrate 10 and spacer layer 16 should be selected so that the refractive index of the spacer layer 16 be smaller than the refractive index of the first spacer layer 14.

Thus, the first spacer layer 14 of the second preferred embodiment of an information storage medium according to the present invention is preferably constructed of any one or any combination of two or more of the following substances:

(1-1) an oxide selected from the group consisting of aluminum oxide ($Al_2O_3$), cerium dioxide ($CeO_2$), chromium oxide ($Cr_2O_3$), di-iron trioxide ($Fe_2O_3$), iron (II) iron (III) oxide ($Fe_3O_4$), germanium oxide ($GeO_2$), diindium trioxide ($In_2O_3$), magnesium oxide (MgO), manganese dioxide ($MnO_2$), molybdenum trioxide ($MoO_3$), diniobium pentoxide ($Nb_2O_5$), nickel monoxide (NiO), silicon monoxide (SiO), samarium oxide ($Sm_2O_3$), tin (IV) oxide ($SnO_2$), ditantalum pentoxide ($Ta_2O_5$), tellurium dioxide ($TeO_2$), titanium dioxide ($TiO_2$), divanadium pentoxide ($V_2O_5$), tungsten trioxide ($WO_3$), yttrium oxide ($Y_2O_3$), zinc oxide (ZnO), and zirconium oxide ($ZrO_2$);

(1-2) a nitride selected from the group consisting of trisilicon nitride ($Si_3N_4$), and zirconium nitride (ZrN);

(1-3) a carbide such as, for example, zirconium carbide (ZrC);

(1-4) a sulfide selected from the group consisting of germanium (II) sulfide (GeS), and zirconium sulfide (ZrS);

(1-5) a phthalocyanine dyestuff selected from the group consisting of cobalt phthalocyanine, copper phthalocyanine, magnesium phthalocyanine, nickel phthalocyanine, and zinc phthalocyanine;

(1-6) an organic compound such as, for example, 3,4,9,10-perylene tetracarboxyl dianhydride (PTCDA) or guanine (2-amino-6-hydropurin);

(1-7) any of magnetic garnets; and (1-8) silicon, selenium, germanium, boron or a compound containing one or more of these.

Figure 5:
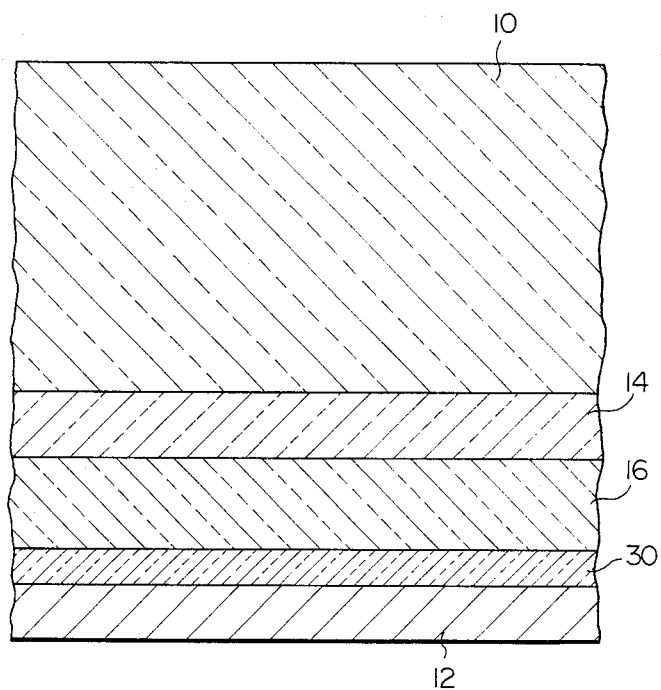
FIG. 5 is a fragmentary sectional view showing a modification of the of second preferred embodiment of an optical information storage medium according to the present invention.

On the other hand, the second spacer layer 16 of the second preferred embodiment of an information storage medium according to the present invention is preferably constructed of any one or any combination of two or more of the following substances:

(2-1) a fluoride selected from the group consisting of aluminum fluoride ($AlF_3$), barium fluoride ($BaF_2$), calcium fluoride ($CaF_2$), cerium (III) fluoride ($CeF_3$), dysprodium fluoride ($DyF_3$), erbium fluoride ($ErF_3$), europium fluoride ($EuF_3$), gadolinium fluoride ($GdF_3$), hafnium fluoride ($HfF_4$), holmium fluoride ($HoF_3$), lanthanum fluoride ($LaF_3$), lithium fluoride (LiF), magnesium fluoride ($MgF_2$), sodium fluoride (NaF), neodimium fluoride ($NdF_3$), praseodymium fluoride ($PrF_3$), samarium fluoride ($SmF_3$), strontium fluoride ($SrF_2$), yttrium fluoride ($YF_2$), and ytterbium fluoride ($YbF_3$);

(2-2) an oxide selected from the group consisting of aluminum oxide ($Al_2O_3$), cerium dioxide ($CeO_2$), chromium oxide ($Cr_2O_3$), dysprodium oxide ($Dy_2O_3$), erbium oxide ($Er_2O_3$), europium oxide ($Eu_2O_3$), di-iron trioxide ($Fe_2O_3$), iron (II) iron (III) oxide ($Fe_3O_4$), gadolinium oxide ($Gd_2O_3$), germanium oxide ($GeO_2$), hafnium oxide ($HfO_2$), holmium oxide ($Ho_2O_3$), diindium trioxide ($In_2O_3$), lutetium oxide ($Lu_2O_3$), magnesium oxide (MgO), manganese dioxide ($MnO_2$), molybdenum trioxide ($MoO_3$), diniobium pentoxide ($Nb_2O_5$), nickel monoxide (NiO), silicon monoxide (SiO), samarium oxide ($Sm_2O_3$), tin (IV) oxide ($SnO_2$), ditantalum pentoxide ($Ta_2O_5$), tellurium dioxide ($TeO_2$), titanium dioxide ($TiO_2$), divanadium pentoxide ($V_2O_5$), tungsten trioxide ($WO_3$), yttrium oxide ($Y_2O_3$), zinc oxide (ZnO), and zirconium oxide ($ZrO_2$);

(2-3) a nitride such as, for example, zirconium nitride (ZrN);

(2-4) a carbide such as, for example, zirconium carbide (ZrC);

(2-5) a sulfide selected from the group consisting of germanium (II) sulfide (GeS), and zirconium sulfide (ZrS);

(2-6) a phthalocyanine dyestuff selected from the group consisting of cobalt phthalocyanine, copper phthalocyanine, magnesium phthalocyanine, molybdenum phthalocyanine, nickel phthalocyanine, zinc phthalocyanine, and Sudan Black "B";

(2-7) any of photoresist materials; and (2-8) an organic compound such as any of electron-beam resist materials, polystyrene, or guanine(2-amino-6-hydropurin).

Where the second spacer layer 16 of the information storage medium shown in FIG. 2 is constructed of an inorganic compound, the storage medium may further comprises an additional layer of an organic compound to add the optical sensitivity of the medium. This additional layer is provided between the second spacer layer 16 and the information carrying layer 12 as indicated at 30 in FIG. 5 and is constructed of any one or any combination of two or more of the following substances:

(3-1) an organic compound such as, for example, 3,4,9,10-perylene tetracarboxyl dianhydride (PTCDA), guanine(2-amino-6-hydropurin) or crystal violet lactone; and (3-2) an organic dyestuff such as, for example,
  (3-2-1) a phthalocyanine dyestuff selected from the group consisting of cobalt phthalocyanine, copper phthalocyanine, magnesium phthalocyanine, nickel phthalocyanine, and zinc phthalocyanine,
  (3-2-2) an alkyl substitution product of any of these phthalocyanine dyestuffs,
  (3-2-3) an anthraquinone dyestuff; or
  (3-2-4) a dyestuff absorptive of a near-infrared radiation such as, for example, 5-amino-8-(p-ethoxyanilino)-2,3-dicyano-1,4-naphthoquinone.

Where a dyestuff absorptive of a near-infrared radiation is used as the material for the additional layer 30, it is preferable that the layer 30 be about 300 angstroms or less thick. If a dyestuff not absorptive of a near-infrared radiation is to be used, it is also preferable for providing an increased reflectivity that the additional layer 30 be relatively thin provided the index of refraction of the material is larger than that of the second spacer layer 16.

The features and advantages of an optical information storage medium according to the present invention will be more clearly appreciated from the following Examples of the invention.

EXAMPLE I

A centrally apertured transparent substrate of an acrylic resin (polymethyl methacrylate) formed with guide grooves was prepared which measured 15 mm in inside diameter, 120 mm in outside diameter and 1.2 mm in thickness. The substrate was placed within a vacuum deposition chamber which was evacuated to less than $2 \times 10^{-5}$ Torr. Within the chamber were also placed a resistance-heated boat containing a charge of tin and an electron-beam heated crucible containing a charge of nickel oxide (NiO). Coevaporation techniques were used to have these substances concurrently deposited on the substrate while controlling the deposition rates of the charges with use of a quartz-crystal resonator plate thickness monitor. The deposition process was terminated when it was observed that the deposit of the coevaporated tin and nickel oxide reached a thickness of about 350 angstroms. A single-layer optical information storage disc including an information carrying layer of tin and nickel oxide uniformly deposited on one surface of the transparent acryl substrate was thus obtained.

A number of such information storage discs were experimentally fabricated each following the procedure of Example I with the bulk concentration of nickel oxide stepwise varied from 0 to 100 percent by volume to the whole bulk of the information carrying layer. Tests (A) were conducted with these sample discs to determine the reflectivity of each of the discs to a laser beam of a 8300 angstrom wavelength. Tests (B) were further conducted to determine the noise levels of the raw or blank (viz., non-information carrying) sample discs with use of a laser beam of the same wavelength. A set of information was then written into each of the sample discs with a succession of pits formed in the information carrying layer of the disc along the guide grooves in the substrate by irradiation of the disc with a laser beam also having the wavelength of 8300 angstroms. The signals used for the writing of the information had a frequency at 1.2 megahertz. Each of the discs was driven for rotation at a circumferential speed of 5 meters per second. Tests (C) were conducted with the resultant information-carrying sample discs to determine the carrier-to-noise ratios (C/N ratios) of the individual discs.

Table 1 demonstrates the results of these tests A, B and C, wherein the figures in the column under the heading "Raw Disc Noise" indicate the results of the tests B and thus refer to the noise levels of the sample discs (numbered 1/1 to 1/10) as determined before information had been written into the discs which are herein referred to as raw or blank discs. In Table I, furthermore, the rightmost column under the heading "Note" refers to the results of evaluation of the discs tested and indicate whether the sample discs are acceptable or "OK" within the purview of the present invention or the discs are unacceptable or "NO" within the purview of the invention. For example, the sample discs numbered ⅓ to ⅛) have been evaluated to be acceptable while the sample discs numbered 1/1, 1/2, 1/9 and 1/10 have been evaluated to be unacceptable. In table 1 et seq., the information carrying layer 12 is simply referred to as "Record Layer".

From the results of the tests A shown in Table 1 it will be seen that there is a tendency that the reflectivities of the discs decrease as the bulk concentrations of the nickel oxide component in the information carrying layer increases. When the bulk concentration (100 percent minus NiO concentration) of the tin component in the information carrying layer is less than 30 percent by volume, the reflectivity of the disc is short of 10 percent. In this instance, the focus servo system of the reproducing apparatus could not operate properly to have the laser beam correctly focussed at the center line of the guide groove. On the other hand, the results of the tests B shown in Table 1 indicate that the noise levels of the raw or blank discs decrease abruptly with addition of nickel oxide to the bulk of tin and are acceptable when the bulk concentration of the nickel oxide component in an information carrying layer is higher than 20 percent. From the results of the tests C, it is seen that the recording sensitivities of discs as represented by the C/N ratios of the discs deteriorate when the bulk concentration of the nickel oxide component is less than 20 percent and the bulk concentration of the tin component is less than 30 percent. Thus, the results of the tests A, B and C show that excellent performance characteristics can be achieved by an information storage medium according to the present invention.

TABLE 1

| Sample No. | NiO Concentration (%) | Reflectivity (%) | Blank Disc Noise Level (dB) | C/N Ratio (dB) | Note |
| --- | --- | --- | --- | --- | --- |
| 1/1 | 0 | 44 | −50 | 43 | NO |
| 1/2 | 9.6 | 35 | −56 | 45 | NO |
| 1/3 | 20.0 | 32 | −61 | 48 | OK |
| 1/4 | 28.0 | 29 | −63 | 55 | OK |
| 1/5 | 38.5 | 20 | −66 | 57 | OK |
| 1/6 | 52.7 | 14 | −69 | 54 | OK |
| 1/7 | 62.3 | 12 | −70 | 51 | OK |
| 1/8 | 70.0 | 10 | −71 | 50 | OK |
| 1/9 | 81.5 | 9 | −71 | 45 | NO |
| 1/10 | 100.0 | 8 | −71 | (*) | NO |

The sign (*) in the bottom row indicates that the disc was unable to record information.

Sample discs were further fabricated with the thickness of the information carrying layer varied from one of the discs to another. Table 2 shows the results of the tests A and C to determine the reflectivities and C/N ratios of the discs which are numbered 2/1 to 2/9. The results of the tests herein shown also indicate that the advantages of the present invention are achieved when the nickel oxide and components of the information carrying layer account respectively for about 20 percent and about 30 percent by volume of the entire bulk of the information carrying layer.

TABLE 2

| Sample No. | NiO Concentration (%) | Thickness (Å) | Reflectivity (%) | C/N Ratio (dB) | Note |
| --- | --- | --- | --- | --- | --- |
| 2/1 | 12.6 | 400 | 27 | 45 | NO |
| 2/2 | 22.4 | 300 | 27 | 48 | NO |
| 2/3 | 26.5 | 250 | 16 | 52 | OK |
| 2/4 | 33.5 | 150 | 14 | 53 | OK |
| 2/5 | 41.9 | 375 | 15 | 56 | OK |
| 2/6 | 44.0 | 500 | 18 | 54 | OK |
| 2/7 | 59.0 | 325 | 12 | 50 | OK |
| 2/8 | 64.4 | 500 | 13 | 48 | OK |
| 2/9 | 74.2 | 400 | 8 | 46 | NO |

EXAMPLE II

A transparent substrate was prepared and was placed within a vacuum deposition chamber as in Example 1. Within the deposition chamber were also placed a resistance-heated boat containing a charge of tin, a first electron-beam heated crucible containing a charge of nickel oxide and a second electron-beam heated crucible containing a charge of chromium. Coevaporation techniques were used to have these substances concurrently deposited on the substrate to bulk concentrations of 60 percent, 35 percent and 5 percent by volume for the tin, nickel oxide and chromium components, respectively. A single-layer optical information storage disc was thus obtained, including an information carrying layer of tin, nickel oxide and chromium uniformly deposited on one surface of the transparent acryl substrate. Information was written into this disc whereupon tests C were conducted with the resultant information-carrying disc to determine the C/N ratio of the disc as in Example 1. The results of the tests showed that the disc was acceptable with the C/N ratio of the disc determined to be about 50 decibels.

EXAMPLE III

A transparent substrate was prepared and was placed within a vacuum deposition chamber also as in Example 1. Within the deposition chamber were also placed a resistance-heated boat containing a charge of tin, a first electron-beam heated crucible containing a charge of nickel oxide and a second electron-beam heated crucible containing a nickel-chorimum (Ni-Cr) alloy consisting of 80 percent by weight of nickel and 20 percent by weight of chromium. Coevaporation techniques were used to have these substances concurrently deposited on the substrate to bulk concentrations of 55 percent, 40 percent and 5 percent by volume for the tin, nickel oxide and nickel-chromium alloy components, respectively. A single-layer optical information storage disc was thus obtained, including an information carrying layer of tin, nickel oxide and chromium uniformly deposited on one surface of the transparent acryl substrate. Information was written into this disc whereupon tests C were conducted with the resultant information-carrying disc to determine the C/N ratio of the disc as in Example 1. The results of the tests showed that the disc was also acceptable with the C/N ratio of the disc determined to be about 50 decibels.

EXAMPLE IV

A transparent substrate was prepared and was placed within a vacuum deposition chamber also as in Example 1. Within the deposition chamber were also placed a resistance-heated boat containing a charge of tin, a first electron-beam heated crucible containing a charge of nickel oxide and a second electron-beam heated crucible containing an iron-chorimum-aluminum (Fe-Cr-Al) alloy consisting of 70 percent by weight of iron, 25 percent by weight of chromium and 5 percent by weight of aluminum. Coevaporation techniques were used to have these substances concurrently deposited on the substrate to bulk concentrations of 55 percent, 40 percent and 5 percent by volume for the tin, nickel oxide and iron-chorimum-aluminum alloy components, respectively. A single-layer optical information storage disc was thus obtained, including an information carrying layer of tin, nickel oxide, iron, chorimum and aluminum uniformly deposited on one surface of the transparent acryl substrate. Information was written into this disc whereupon tests C were conducted with the resultant information-carrying disc to determine the C/N ratio of the disc as in Example 1. The results of the tests showed that the disc was also acceptable with the C/N ratio of the disc determined to be about 49 decibels.

EXAMPLE V

A centrally apertured transparent substrate of an acrylic resin (polymethyl methacrylate) formed with guide grooves was prepared which measured 15 mm in inside diameter, 120 mm in outside diameter and 1.2 mm in thickness. The substrate was placed within a vacuum deposition chamber which was evacuated to less than $2\times 10^{-5}$ Torr. Within the deposition chamber were also placed a resistance-heated boat containing a charge of tin, a first electron-beam heated crucible containing a charge of nickel oxide (NiO) and a second electron-beam heated crucible containing a charge of silicon dioxide ($SiO_2$). Nickel oxide was first deposited on the substrate to form a first spacer layer of a thickness of about 1100 angstroms, whereupon silicon dioxide was deposited to form on the first spacer layer of nickel oxide a second spacer layer of a thickness of about 1300 angstroms. Coevaporation techniques were then used to have tin and nickel oxide concurrently deposited on the resultant two-layer structure while controlling the deposition rates of the charges with use of a quartz-crystal oscillator plate thickness monitor. The deposition process was terminated when it was observed that the deposit of the coevaporated tin and nickel oxide reached a thickness of about 300 angstroms. A three-layer optical information storage disc including an information carrying layer of tin and nickel oxide uniformly deposited on the second spacer layer of silicon dioxide was thus obtained.

A small number of such information storage discs were experimentally fabricated each following the procedure of Example V with the bulk concentration of nickel oxide stepwise varied from 0 to 100 percent to the whole bulk of the information carrying layer. Tests A were conducted with these sample discs to determine the reflectivity of each of the discs to a laser beam of a 8300 angstrom wavelength. A set of information was then written into each of the sample discs with a succession of pits formed in the information carrying layer of the disc along the guide grooves in the substrate by irradiation of the disc with a laser beam also having the wavelength of 8300 angstroms. Tests C were conducted with the resultant information-carrying sample discs to determine the C/N ratios of the individual discs.

Table 3 demonstrates the results of the tests A and C thus carried out. From the results of the tests A shown in Table 3 it will also be seen that there is a tendency that the reflectivities of the discs decrease as the bulk concentrations of the nickel oxide component in the information carrying layer increases. When the bulk concentration (100 percent minus NiO concentration) of the tin component in the information carrying layer is less than 30 percent by volume, the reflectivity of the disc is short of 10 percent. On the other hand, the results of the tests C shown in Table 3 indicate that the recording sensitivities of discs as represented by the C/N ratios of the discs deteriorate in the absence of the nickel oxide component in the information carrying layer. Thus, the results of the tests A and C also show that excellent performance characteristics can be achieved by an information storage medium according to the present invention.

TABLE 3

| Sample No. | NiO Concentration (%) | Thickness (Å) | Reflectivity (%) | C/N Ratio (dB) | Note |
|---|---|---|---|---|---|
| 3/1 | 0 | 300 | 56 | less than 48 | NO |
| 3/2 | 20 | 300 | 52 | more than 48 | OK |
| 3/3 | 42 | 300 | 30 | more than 48 | OK |
| 3/4 | 59 | 300 | 29 | more than 48 | OK |
| 3/5 | 70 | 300 | 23 | more than 48 | OK |
| 3/6 | 100 | 300 | 9 | (**) | NO |

The sign (**) in the bottom row indicates that the disc was unable to record information.

Sample discs each devoid of the first and second spacer layers were fabricated with their information-carrying layers respectively proportioned similarly to the sample discs 3/2, 3/3, 3/4 and 3/5 above. Table 4 shows the results of the tests A and C to determine the reflectivities and C/N ratios of the discs which are numbered 4/1 to 4/4. Comparison between the results of the tests for the discs 3/2, 3/3, 3/4 and 3/5 as shown in Table 3 and the results of the tests for the discs 4/2, 4/3, 4/4 and 4/5 as shown in Table 4 clearly reveals that the provision of the additional spacer layers 14 and 16 significantly contributes to increasing the reflectivity of the disc.

TABLE 4

| Sample No. | NiO Concentration (%) | Reflectivity (%) | Note |
|---|---|---|---|
| 4/1 | 20 | 30 | NO |
| 4/2 | 42 | 10 | NO |
| 4/3 | 59 | 10 | NO |
| 4/4 | 70 | 8 | NO |

EXAMPLE VI

A transparent substrate of an acrylic resin was prepared and was placed within a vacuum deposition chamber as in Example V. Within the deposition chamber were also placed a first evaporation source of tin (IV) oxide ($SnO_2$), a second evaporation source of guanine, a third evaporation source of tin, and a fourth evaporation source of nickel oxide. Tin oxide was first deposited on the substrate to form a first spacer layer, whereupon guanine was deposited to form a second spacer layer on the first spacer layer of tin oxide. Coevaporation techniques were then used to have tin and nickel oxide concurrently deposited on the resultant two-layer structure as in Example V. A three-layer optical information storage disc including an information carrying layer of tin and nickel oxide uniformly deposited on the second spacer layer of guanine was thus obtained.

A small number of such information storage discs were experimentally fabricated each following the procedure of Example V with the thickness of the tin oxide layer selected at about 700 or 900 angstroms, with the thickness of the guanine layer selected at about 900 or 1100 angstroms, with the thickness of the coevaporated tin and nickel oxide layer selected at about 300, 350 or 400 angstroms and with the bulk concentration of nickel oxide stepwise varied through 30 percent by volume to the whole bulk of the information carrying layer. Tests A were conducted with these sample discs to determine the reflectivity of each of the discs as in Example V. Information was then written into each of the sample discs, whereupon tests C were conducted with the resultant information-carrying sample discs also as in Example V. The results of the tests A and C thus carried out are indicated in Table 5, from which it will be also seen that excellent performance characteristics can be achieved by an information storage medium according to the present invention.

TABLE 5

| Sample No. | SnO2 Layer (Å) | Guanine Layer (Å) | NiO Concentration (%) | Record Layer (Å) | Reflectivity (%) | C/N Ratio | Note |
|---|---|---|---|---|---|---|---|
| 5/1 | 900 | 1100 | 27 | 300 | 32 | more than 48 | OK |
| 5/2 | 700 | 900 | 27 | 300 | 25 | more than 48 | OK |
| 5/3 | 900 | 1100 | 42 | 300 | 19 | more than 48 | OK |
| 5/4 | 900 | 1100 | 42 | 400 | 26 | more than 48 | OK |
| 35 | 900 | 1100 | 59 | 350 | 22 | more than 48 | OK |

EXAMPLE VII

A transparent substrate of an acrylic resin was prepared and was placed within a vacuum deposition chamber as in Example V. Within the deposition chamber were also placed a first evaporation source of copper phthalocyanine, a second evaporation source of silicon dioxide, a third evaporation source of tin, a fourth evaporation source of nickel oxide, and a fifth evaporation source of a nickel-chorimum (Ni-Cr) alloy consisting of 80 percent by weight of nickel and 20 percent by weight of chromium. Copper phthalocyanine was first deposited on the substrate to form a first spacer layer of a thickness of about 1000 angstroms, whereupon silicon dioxide was deposited to form a second spacer layer of a thickness of about 1400 angstroms on the first spacer layer of copper phthalocyanine. Coevaporation techniques were then used to have tin, nickel oxide and nickel-chorimum alloy concurrently deposited on the resultant two-layer structure to bulk concentrations of 55 percent, 40 percent and 5 percent, respectively, on a volume basis. A three-layer optical information storage disc including an information carrying layer of tin, nickel oxide and nickel-chorimum alloy uniformly deposited on the second spacer layer of silicon dioxide was thus obtained.

Tests A were conducted with such sample discs and tests C conducted with the resultant information-carrying sample discs also as in Example V. The tests A revealed that the reflectivities of the raw or blank discs were about 21 percent while the tests C revealed that the C/N ratios of the information-carrying discs were more than 48 decibels.

EXAMPLE VIII

A transparent substrate of an acrylic resin was prepared and was placed within a vacuum deposition chamber as in Example V. Within the deposition chamber were also placed a first evaporation source of tin (IV) oxide ($SnO_2$), a second evaporation source of cerium dioxide ($CeO_2$), a third evaporation source of tin, and a fourth evaporation source of nickel oxide. Tin oxide was first deposited on the substrate to form a first spacer layer of a thickness of about 900 angstroms, whereupon cerium dioxide was deposited to form a second spacer layer of a thickness of about 1100 angstroms on the first spacer layer of tin oxide. Coevaporation techniques were then used to have tin and nickel oxide concurrently deposited on the resultant two-layer structure to bulk concentrations of 58 percent and 42 percent, respectively and to a thickness of about 400 angstroms. A three-layer optical information storage disc including an information carrying layer of tin and nickel oxide uniformly deposited on the second spacer layer of silicon dioxide was thus obtained.

Tests A were conducted with such sample discs and tests C conducted with the resultant information-carrying sample discs also as in Example V. The tests A revealed that the reflectivities of the raw or blank discs were about 26 percent while the tests C revealed that the C/N ratios of the information-carrying discs were more than 48 decibels.

EXAMPLE IX

A transparent substrate of an acrylic resin was prepared and was placed within a vacuum deposition chamber as in Example V. Within the deposition chamber were also placed a first evaporation source of tin (IV) oxide ($SnO_2$), a second evaporation source of cerium dioxide ($CeO_2$), a third evaporation source of crystal violet lactone, a fourth evaporation source of tin, and a fifth evaporation source of nickel oxide. Tin oxide was first deposited on the substrate to form a first spacer layer of a thickness of about 900 angstroms, whereupon cerium dioxide was deposited to form a second spacer layer of a thickness of about 1000 angstroms on the first spacer layer of tin oxide. Subsequently, crystal violet lactone was deposited to form an additional layer of a thickness of about 100 angstroms on the second spacer layer of cerium dioxide. Coevaporation techniques were then used to have tin and nickel oxide concurrently deposited on the resultant three-layer structure to bulk concentrations of 58 percent and 42 percent, respectively, on a volume basis and to a thickness of about 400 angstroms. A four-layer optical information storage disc including an information carrying layer of tin and nickel oxide uniformly deposited on the additional layer of crystal violet lactone was thus obtained.

Tests A were conducted with such sample discs and tests C conducted with the resultant information-carrying sample discs also as in Example V. The results of the tests A show that the reflectivities of the raw or blank discs were about 26 percent while the results of the tests C show that the C/N ratios of the information-carrying discs were more than 48 decibels. The additional layer of crystal violet lactone being provided between the information carrying layer and the second spacer layer, the information-carrying sample discs displayed higher recording sensitivities with the C/N ratios of more than 48 decibels achieved when the discs were driven for rotation at circumferential speeds of higher than 10 meters per second.

EXAMPLE X

A transparent substrate of an acrylic resin was prepared and was placed within a vacuum deposition chamber as in Evample V. Within the deposition chamber were also placed a first evaporation source of nickel oxide, a second evaporation source of silicon dioxide, a third evaporation source of 3,4,9,10-perylene tetracarboxyl dianhydride (PTCDA), a fourth evaporation source of tin, and a fifth evaporation source of nickel oxide. Nickel oxide was first deposited on the substrate to form a first spacer layer, whereupon silicon dioxide was deposited to form a second spacer layer on the first spacer layer of tin oxide. Subsequently, PTCDA was deposited to form an additional layer on the second spacer layer of silicon dioxide. Coevaporation techniques were then used to have tin and nickel oxide concurrently deposited on the resultant three-layer structure. A four-layer optical information storage disc including an information carrying layer of tin and nickel oxide uniformly deposited on the additional layer of PTCDA was thus obtained.

A small number of such information storage discs were experimentally fabricated each following the procedure of Example X with the thickness of the nickel oxide layer selected at about 1000, 1100 or 1400 angstroms, with the thickness of the silicon dioxide layer selected at about 1200 or 1400 angstroms, with the thickness of the PTCDA layer selected at about 150, 300 or 450 angstroms, with the thickness of the coevaporated tin and nickel oxide layer selected at about 250 or 300 angstroms and with the bulk concentration of nickel oxide selected at 42 or 27 percent by volume to the whole bulk of the information carrying layer.

Tests A were conducted with these sample discs and tests C conducted with the resultant information-carrying sample discs also as in Example V. Table 6 shows the results of these tests A and C, wherein the sample discs tested are numbered 6/1, 6/2, 6/3, 6/4, 6/5, and 6/6. From this Table 6 it will also be seen that excellent performance characteristics can be achieved by an information storage medium according to the present invention.

index than the first spacer layer 14 at the particular wavelength of the radiation.

The tin component of the information carrying layer 12 is advantageous in that it provides a high degree of recording sensitivity for the information storage medium. If, however, the information carrying layer is constructed solely of tin, the resultant information storage medium could not be used for practical purposes because of the poor surface state of the layer of tin, such a poor surface state resulting from the particular crystal structure of a bulk of tin. When tin is used in combination with nickel oxide for the formation of the information carrying layer of an information storage medium and the proportion between the tin and nickel components of such an information carrying layer is selected as herein specified, the information carrying layer has a significantly improved surface state which enables the information storage medium to provide excellent performance characteristics when used on an optical information recording and reproducing apparatus.

What is claimed is:

1. An optical information storage medium comprising a substantially transparent substrate and an information carrying layer positioned on one side of the substrate, wherein said information carrying layer contains at least 30 percent by volume of tin and at least 20 percent by volume of nickel oxide.

2. An optical information storage medium as set forth in claim 1, in which said information carrying layer is formed on one surface of said substrate.

3. An optical information storage medium as set forth

TABLE 6

| Sample No. | Thickness (Å) of | | | | NiO Concentration (%) | Reflectivity (%) | C/N Ratio | Note |
| | NiO Layer | SiO$_2$ Layer | PTCDA Layer | Record Layer | | | | |
| --- | --- | --- | --- | --- | --- | --- | --- | --- |
| 6/1 | 1100 | 1400 | 150 | 300 | 42 | 28 | more than 48 | OK |
| 6/2 | 1100 | 1400 | 150 | 300 | 42 | 25 | more than 48 | OK |
| 6/3 | 1100 | 1400 | 300 | 300 | 42 | 20 | more than 48 | OK |
| 6/4 | 1000 | 1200 | 450 | 300 | 42 | 26 | more than 48 | OK |
| 6/5 | 1000 | 1200 | 300 | 250 | 27 | 33 | more than 48 | OK |
| 6/6 | 1400 | 1400 | 300 | 250 | 27 | 25 | more than 48 | OK |

As will have been understood from the foregoing description an optical information storage medium according to the present invention basically comprises a substantially transparent substrate 10 and an information carrying layer 12 positioned on one side of the substrate, wherein the information carrying layer 12 contains at least 30 percent by volume of tin and at least 20 percent by volume of nickel oxide. In one preferred embodiment of the present invention, the information carrying layer 12 is formed directly on one surface of said substrate. In another preferred embodiment of the present invention, the information storage medium further comprises a first spacer layer 14 formed on one surface of the substrate 10 and a second spacer layer 16 which intervenes between the first spacer layer 14 and said information carrying layer. The first spacer layer 14 is substantially transparent to a radiation with a predetermined wavelength and is larger in refractive index than the substrate 10 at the aforesaid wavelength. The second spacer layer 16 is also substantially transparent to the aforesaid radiation and is smaller in refractive in claim 1, further comprising a first spacer layer formed on one surface of said substrate and a second spacer layer which intervenes between said first spacer layer and said information carrying layer, wherein said first spacer layer is substantially transparent to a radiation with a predetermined wavelength and is larger in refractive index than said substrate at said wavelength and said second spacer layer is substantially transparent to said radiation and is smaller in refractive index than said first spacer layer at said wavelength.

4. An optical information storage medium as set forth in claim 3, further comprising an additional layer of an organic compound intervening between said second spacer layer and said information carrying layer.

5. An optical information storage medium as set forth in claim 1, in which said information carrying layer further contains an additional material which consists at least one of carbon, aluminum, titanium, chromium, iron, cobalt, nickel, copper, zinc, germanium, zirconium, niobium, molybdeneum, rhodium, palladium, silver, tantalum, tungsten, platinum, and gold.

6. An optical information storage medium as set forth in claim 5, in which said additional material accounts for about 10 percent to about 15 percent by volume of said information carrying layer.

7. An optical information storage medium as set forth in claim 1, in which said information carrying layer has a thickness with a range of from about 100 angstroms to about 1000 angstroms.

8. An optical information storage medium as set forth in claim 1, in which said information carrying layer has a thickness with a range of from about 150 angstroms to about 500 angstroms.

9. An optical information storage medium as set forth in claim 3, in which said first spacer layer contains at least one of
- (1-1) an oxide selected from the group consisting of aluminum oxicde, cerium oxide, chromium oxide, iron oxides, germanium oxide, indium oxide, magnesium oxide, manganese dioxide, molybdenum oxide, niobium oxide, nickel oxide, silicon oxide, samarium oxide, tin oxide, tantalum oxide, tellurium oxide, titanium oxide, vanadium oxide, tungsten oxide, yttrium oxide, zinc oxide, and zirconium oxide;
- (1-2) a nitride selected from the group consisting of trisilicon nitride, and zirconium nitride;
- (1-3) a carbide such as, for example, zirconium carbide;
- (1-4) a sulfide selected from the group consisting of germanium sulfide, and zirconium sulfide;
- (1-5) a phthalocyanine dyestuff selected from the group consisting of cobalt phthalocyanine, copper phthalocyanine, magnesium phthalocyanine, nickel phthalocyanine, and zinc phthalocyanine;
- (1-6) an organic compound such as 3,4,9,10-perylene tetracarboxyl dianhydride or guanine;
- (1-7) any of magnetic garnets; and
- (1-8) silicon, selenium, germanium, boron or a compound containing one or more of these.

10. An optical information storage medium as set forth in claim 3, in which said second spacer layer contains at least one of
- (2-1) a fluoride selected from the group consisting of aluminum fluoride, barium fluoride, calcium fluoride, cerium fluoride, dysprodium fluoride, erbium fluoride, europium fluoride, gadolinium fluoride, hafnium fluoride, holmium fluoride, lanthanium fluoride, lithium fluoride, magnesium fluoride, sodium fluoride, neodimium fluoride, praseodymium fluoride, samarium fluoride, strontium fluoride, yttrium fluoride, and ytterbium fluoride;
- (2-2) an oxide selected from the group consisting of aluminum oxide, cerium oxide, chromium oxide, dysprodium oxide ($Dy_2O_3$), erbium oxide, europium oxide, iron oxides, gadolinium oxide, germanium oxide, hafnium oxide, holmium oxide, indium oxide, lutetium oxide, magnesium oxide, manganese oxide, molybdenum oxide, diniobium pentoxide, nickel oxide, silicon oxide, samarium oxide, tin oxide, ditantalum pentoxide, tellurium oxide, titanium oxide, vanadium oxide, tungsten oxide, yttrium oxide, zinc oxide, and zirconium oxide;
- (2-3) a nitride such as, for example, zirconium nitride;
- (2-4) a carbide such as zirconium carbide;
- (2-5) a sulfide selected from the group consisting of germanium sulfide, and zirconium sulfide;
- (2-6) a phthalocyanine dyestuff selected from the group consisting of cobalt phthalocyanine, copper phthalocyanine, magnesium phthalocyanine, molybdenum phthalocyanine, nickel phthalocyanine, zinc phthalocyanine, and Sudan Black "B";
- (2-7) any of photoresist materials; and
- (2-8) an organic compound such as any of electron-beam resist materials, polystyrene, or guanine.

11. An optical information storage medium as set forth in claim 4, in which said additional layer contains at least one of
- (3-1) an organic compound such as 3,4,9,10-perylene tetracarboxyl dianhydride, guanine or crystal violet lactone; and
- (3-2) an organic dyestuff such as
  - (3-2-1) a phthalocyanine dyestuff selected from the group consisting of cobalt phthalocyanine, copper phthalocyanine, magnesium phthalocyanine, nickel phthalocyanine, and zinc phthalocyanine,
  - (3-2-2) an alkyl substitution product of any of these phthalocyanine dyestuffs,
  - (3-2-3) an anthraquinone dyestuff; or
  - (3-2-4) a dyestuff absorptive of a near-infrared radiation such as, 5-amino-8-(p-ethoxyanilino)-2,3-dicyano-1,4-naphthoquinone.

12. An optical information storage medium as set forth in claim 11, in which said additional layer contains a dyestuff absorptive of a near-infrared radiation, wherein said additional layer has a thickness less than about 300 angstroms.

13. An optical information storage medium as set forth in claim 1, in which a said substrate consistsm of a synthetic resin, glass or porcelain, said synthetic resin being an acrylic resin such as polymethyl methacrylate; poly carbonate; polyetherimido; polysulfone; an epoxy resin; or polyvinyl chloride.

* * * * *